(12) United States Patent
Lee et al.

(10) Patent No.: US 8,455,143 B2
(45) Date of Patent: Jun. 4, 2013

(54) NON-AQUEOUS ELECTROLYTE SOLUTION FOR LITHIUM ION SECONDARY BATTERY AND LITHIUM ION SECONDARY BATTERY HAVING THE SAME

(75) Inventors: Ho-Chun Lee, Daejeon (KR); Jong-Ho Jeon, Daejeon (KR); Jeong-Ju Cho, Daejeon (KR)

(73) Assignee: LG Chem, Ltd. (KR)

( * ) Notice: Subject to any disclaimer, the term of this patent is extended or adjusted under 35 U.S.C. 154(b) by 292 days.

(21) Appl. No.: 12/663,117

(22) PCT Filed: Jun. 5, 2008

(86) PCT No.: PCT/KR2008/003186
§ 371 (c)(1),
(2), (4) Date: Jul. 6, 2010

(87) PCT Pub. No.: WO2008/150134
PCT Pub. Date: Dec. 11, 2008

(65) Prior Publication Data
US 2010/0273065 A1    Oct. 28, 2010

(30) Foreign Application Priority Data
Jun. 7, 2007    (KR) .................. 10-2007-0055532

(51) Int. Cl.
*H01M 6/16* (2006.01)
(52) U.S. Cl.
USPC ........... 429/330; 429/331; 429/332; 429/334; 429/337; 429/338; 429/339; 429/340; 429/341; 429/343; 429/199; 429/200; 252/62.2
(58) Field of Classification Search
USPC ................. 429/330, 331, 332, 334, 337, 338, 429/339, 340, 341, 343, 199, 200; 252/62.2
See application file for complete search history.

(56) References Cited

U.S. PATENT DOCUMENTS

| 6,861,175 | B2 | 3/2005 | Sekino et al. |
|---|---|---|---|
| 6,866,966 | B2 | 3/2005 | Hamamoto et al. |
| 6,942,948 | B2 | 9/2005 | Takehara et al. |
| 7,223,502 | B2 | 5/2007 | Onuki |
| 7,233,502 | B1 | 6/2007 | Chang |
| 2002/0164531 | A1 | 11/2002 | Sekino et al. |
| 2003/0165733 | A1 | 9/2003 | Takehara et al. |
| 2006/0154116 | A1 | 7/2006 | Siret et al. |
| 2008/0305400 | A1* | 12/2008 | Biensan et al. ............ 429/324 |

FOREIGN PATENT DOCUMENTS

| CN | 1387685 A | 12/2002 |
|---|---|---|
| CN | 1848510 A | 10/2006 |
| JP | 5-074487 A | 3/1993 |
| JP | 5-074488 A | 3/1993 |
| JP | 05242910 A | 9/1993 |
| JP | 8339824 A | 12/1996 |
| JP | 2001126765 A | 5/2001 |
| JP | 2002050398 A | 2/2002 |
| JP | 2007141831 A | 6/2007 |
| KR | 10-0342605 | 8/2001 |
| KR | 20070005340 A | 1/2007 |
| WO | 2007055087 | 5/2007 |

OTHER PUBLICATIONS

International Search Report, PCT/KR2008/003186, dated Sep. 24, 2008.
Ohta et al., "Relationship between carbonaceous materials and electrolyte in secondary lithium-ion batteries", Journal of Power Sources 54 (1995) 6-10.
Sashin et al., "Performance of Li-ion cells with new electrolytes conceived for low-temperature applications", Journal of Power Sources 87 (2000) 112-117.

\* cited by examiner

*Primary Examiner* — Laura Weiner
(74) *Attorney, Agent, or Firm* — Lerner, David, Littenberg, Krumholz & Mentlik, LLP

(57) ABSTRACT

A non-aqueous electrolyte solution for a lithium ion secondary battery includes a lithium salt and an organic solvent. The organic solvent includes a carbonate compound, a linear ester compound and a linear ester decomposition inhibitor. This non-aqueous electrolyte solution restrains swelling while improving low temperature charging/discharging characteristics of the secondary battery in comparison to a conventional electrolyte since it contains the linear ester compound and the linear ester decomposition inhibitor. The non-aqueous electrolyte solution may be used in making a lithium ion secondary battery.

6 Claims, No Drawings

NON-AQUEOUS ELECTROLYTE SOLUTION FOR LITHIUM ION SECONDARY BATTERY AND LITHIUM ION SECONDARY BATTERY HAVING THE SAME

CROSS REFERENCE TO RELATED APPLICATIONS

The present application is a national phase entry under 35 U.S.C. §371 of International Application No. PCT/KR2008/003186, filed Jun. 5, 2008, published in English, which claims priority from Korean Patent Application No. 10-2007-0055532, filed Jun. 7, 2007. The disclosures of said applications are incorporated by reference herein.

TECHNICAL FIELD

The present invention relates to a non-aqueous electrolyte solution for a lithium ion secondary battery, and a lithium ion secondary battery having the same.

BACKGROUND ART

With recent and rapid developments of information communication industries, electronic devices have become smaller, lighter, slimmer and more portable, which increases a demand for batteries having higher energy density as a driving power source of an electronic device. Among such batteries, lithium ion secondary batteries satisfy this demand, and numerous studies towards improvements are now in progress actively. A lithium ion secondary battery includes a cathode, an anode, an electrolyte and a separator that provides a passage for lithium ions moving between the cathode and the anode. When lithium ions are intercalated into or disintercalated from the cathode or the anode, the lithium ion secondary batteries generate electric energy by means of a redox reaction.

The initial design of such lithium ion secondary batteries uses a lithium metal having a high energy density as an anode and also uses a liquid solvent as an electrolyte. However, lithium ion secondary batteries of this type have a short life cycle due to dendrite formation. In order to solve this problem, there have been developed lithium ion secondary batteries using a carbon material capable of absorbing a large amount of lithium ions as an anode instead of lithium metal and also using an organic liquid or solid polymer as an electrolyte.

The lithium ion secondary batteries using a carbon material as an anode active material employ a mixture of a cyclic carbonate, such as ethylene carbonate and propylene carbonate, and a linear carbonate, such as dimethyl carbonate, ethylmethyl carbonate and diethyl carbonate, as an electrolyte solution. However, such a non-aqueous electrolyte solution disadvantageously exhibits a low lithium ionic conductivity at low temperature. For this reason, the lithium ion secondary batteries has low charging/discharging cycle efficiencies, which has a negative influence on low temperature charging/discharging properties.

Thus, there have been continuous studies attempting to improve high rate charging/discharging characteristics of a secondary battery by using a non-aqueous electrolyte solution. For example, Japanese Patent No. 3,032,338 and No. 3,032,339 disclose a non-aqueous electrolyte solution using a ternary system of a cyclic carbonate, linear carbonate and linear ester compound in order to improve high rate charging/discharging characteristics and low temperature charging/discharging cycle efficiencies.

However, such a ternary-system non-aqueous electrolyte solution exhibits the problem of increased swelling at a high temperature, though the low temperature charging/discharging characteristics are partially improved. Thus, there is a need for improving charging/discharging efficiency in lithium ion secondary batteries and solving swelling problem at high temperatures.

DISCLOSURE OF INVENTION

Technical Problem

The present invention is designed to solve the above problems of the prior art, and therefore it is an objective of the present invention to provide a non-aqueous electrolyte solution for a lithium ion secondary battery, which makes it possible to greatly reduce the swelling phenomenon at high temperatures together with ensuring excellent charging/discharging characteristics.

Technical Solution

In order to accomplish the above objective, the present invention provides a non-aqueous electrolyte solution for a lithium ion secondary battery, which includes a lithium salt and an organic solvent, wherein the organic solvent includes a carbonate compound, a linear ester compound and a linear ester decomposition inhibitor. The non-aqueous electrolyte solution for a lithium ion secondary battery according to the present invention restrains the swelling phenomenon and at the same time improves low temperature charging/discharging characteristics of the secondary battery as compared to a conventional electrolyte solution, since the electrolyte of the present invention includes a linear ester compound and a linear ester decomposition inhibitor.

The linear ester compound used in the present invention may be expressed by the following Chemical Formula 1:

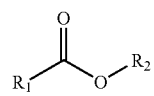

Chemical Formula 1 where $R_1$ and $R_2$ are independently a linear or branched $C_{1-5}$ alkyl group, and $R_1$ and $R_2$ may be unsubstituted or substituted with at least one halogen, respectively.

The linear ester compound may be selected from the group consisting of methyl acetate, ethyl acetate, methyl propionate, ethyl propionate, propyl propionate, butyl propionate, methyl butyrate, and ethyl butyrate, but it is not limited thereto.

The linear ester decomposition inhibitor used in the present invention may include as representative examples any one material or a mixture of at least two materials selected from the group consisting of pyrrole, thiophene, aniline, biphenyl, cyclohexyl benzene, fluoro-toluene, tris(trifluoroethyl)phosphate, γ-butyrolactone, γ-valerolactone, butyronitrile, hexanenitrile, succinonitrile, adiponitrile, valeronitrile, siloxane, silane, and halogenated compounds thereof, but it is not limited thereto.

As the lithium salt incorporated in the non-aqueous electrolyte solution of the present invention, any lithium salt material commonly used in an electrolyte solution for a lithium ion secondary battery may be used. The lithium salt may be representatively any one material or a mixture of at least two materials selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$ and $LiC(CF_3SO_2)_3$.

As the carbonate compound included in the non-aqueous electrolyte solution of the present invention, any carbonate material commonly used in an electrolyte of a lithium ion secondary battery may be used. The carbonate compound may include as representative examples any one material or a mixture of at least two materials selected from the group consisting of ethylene carbonate, 3-fluoroethylene carbonate, propylene carbonate, dimethyl carbonate, diethyl carbonate, methylpropyl carbonate, ethylpropyl carbonate, methylethyl carbonate, and butylene carbonate.

The non-aqueous electrolyte solution for a lithium ion secondary battery according to the present invention preferably includes about 100 to about 250 parts by weight of a linear ester compound and about 0.1 to about 20 parts by weight of a linear ester decomposition inhibitor, based on 100 parts by weight of the carbonate compound, so as to provide for desired effects with respect to the present invention.

The non-aqueous electrolyte solution explained above may be used for making a lithium ion secondary battery.

BEST MODE FOR CARRYING OUT THE INVENTION

Hereinafter, preferred embodiments of the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventors are allowed to define terms appropriately for the best explanation.

A non-aqueous electrolyte solution for a lithium ion secondary battery according to the present invention includes a lithium salt and an organic solvent. The organic solvent includes a carbonate compound, a linear ester compound and a linear ester decomposition inhibitor.

The present invention is characterized in that a linear ester compound and a linear ester decomposition inhibitor are incorporated in a non-aqueous electrolyte solution for a lithium ion secondary battery. The non-aqueous electrolyte solution of the present invention may improve low temperature charging/discharging characteristics by containing the linear ester compound. However, this linear ester compound gives rise to side reactions at the cathode interface, generating gas that leads to a swelling phenomenon. Thus, the linear ester decomposition inhibitor is used for restraining such a swelling phenomenon.

The linear ester compound used in the present invention preferably employs a compound expressed by the following Chemical Formula 1 so as to further improve the low temperature charging/discharging characteristics.

Chemical Formula 1

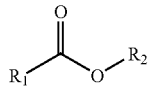

where $R_1$ and $R_2$ are independently a linear or branched $C_{1-5}$ alkyl group, and $R_1$ and/or $R_2$ may be unsubstituted or substituted with at least one halogen.

The linear ester compound as representative examples is selected from the group consisting of methyl acetate, ethyl acetate, methyl propionate, ethyl propionate, propyl propionate, butyl propionate, methyl butyrate, and ethyl butyrate, but it is not limited thereto.

The linear ester decomposition inhibitor used in the present invention includes as representative examples any one material or a mixture of at least two materials selected from the group consisting of pyrrole, thiophene, aniline, biphenyl, cyclohexyl benzene, fluoro-toluene, tris(trifluoroethyl)phosphate, γ-butyrolactone, γ-valerolactone, butyronitrile, hexanenitrile, succinonitrile, adiponitrile, valeronitrile, siloxane, silane, and halogenated compounds thereof, but not it is limited thereto.

As the lithium salt incorporated in the non-aqueous electrolyte solution of the present invention, any lithium salt material commonly used in an electrolyte solution for a lithium ion secondary battery may be used. The lithium salt includes as representative examples any one material or a mixture of at least two materials selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$ and $LiC(CF_3SO_2)_3$.

The carbonate compound included in the non-aqueous electrolyte solution of the present invention includes as representative examples any one material or a mixture of at least two materials selected from the group consisting of ethylene carbonate, 3-fluoroethylene carbonate, propylene carbonate, dimethyl carbonate, diethyl carbonate, methylpropyl carbonate, ethylpropyl carbonate, methylethyl carbonate and butylene carbonate. In particular, among the carbonate-based organic solvents, cyclic carbonates such as ethylene carbonate and propylene carbonate may be preferably used since they have high viscosity such that they show high dielectric constants and thus easily dissociate lithium salts in the electrolyte. Also, if a linear carbonate with low viscosity and low dielectric constant such as dimethyl carbonate and diethyl carbonate is mixed with a cyclic carbonate at a suitable ratio, it is possible to make an electrolyte solution with a high electric conductivity, more preferably.

The non-aqueous electrolyte solution for a lithium ion secondary battery according to the present invention preferably includes about 100 to about 250 parts by weight of a linear ester compound and about 0.1 to about 20 parts by weight of a linear ester decomposition inhibitor, based on 100 parts by weight of the carbonate compound. Within the above range, the linear ester compound gives the desired effects of the present batteries, improves ionic conductivity and also decreases side reactions caused by the linear ester compound. Also, within the above range, the linear ester decomposition inhibitor exhibits better effects in inhibiting decomposition of the linear ester compound.

The non-aqueous electrolyte solution for a lithium ion secondary battery according to the present invention is injected into an electrode structure having a cathode, an anode and a separator interposed between the cathode and the anode, thereby making a lithium ion secondary battery. The cathode, the anode and the separator used in the electrode structure may be formed from any kind of material commonly used in making a lithium ion secondary battery.

More specifically, a cathode active material may preferably be a lithium-containing transition metal oxide, for example, any one material or a mixture of at least two materials selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0 \leq y<1$), $Li(Ni_aCo_bMn_c)O_4$ ($0<a<2$, $0<b<2$, $0<c<2$, $a+b+$ c=2), $LiMn_{2-z}Ni_zO_4$, $LiMn_{2-z}Co_zO_4$ (0<z<2), $LiCoPO_4$ and $LiFePO_4$. Also, sulfide, selenide and halide may be used in addition to the above oxides.

An anode active material may be formed from carbon material, lithium metal, silicon or tin, into/from which lithium ions may be intercalated or disintercalated. Among them, carbon material is preferred. The carbon material may be low-crystalline carbon or high-crystalline carbon. The low-crystalline carbon may be soft carbon or hard carbon as representative examples, and the high-crystalline carbon may be natural graphite, Kish graphite, pyrolytic carbon, mesophase pitch based carbon fiber, meso-carbon microbeads, mesophase pitches, or high-temperature sintered carbon, such as petroleum or coal tar pitch derived cokes, as representative examples. The anode may contain a binding agent, which may employ various kinds of binder polymers, such as PVDF-co-HFP, polyvinylidenefluoride, polyacrylonitrile, and polymethylmethacrylate.

In addition, the separator may be formed of common porous polymer films used as a conventional separator, such as porous polymer film made using ethylene homopolymer, propylene homopolymer, ethylene/butene copolymer, ethylene/hexene copolymer or ethylene/methacrylate copolymer, in a single layer or in laminate form. In other cases, the separator may be formed of a common porous non-woven fabric such as a non-woven fabric made of glass fiber with a high melting point or polyethylene terephthalate fiber, but it is not limited thereto.

The lithium ion secondary battery of the present invention may have a variety of shapes which are not specially limited. Examples include a cylindrical can shape, an angled shape, a pouch shape or a coin shape.

MODE FOR THE INVENTION

Hereinafter, various preferred examples will be described in detail to illustrate the present invention. However, the examples of the present invention may be modified in various ways, and they should not be interpreted as limiting the scope of the invention. The examples of the present invention are presented only for a better understanding of the invention to persons having ordinary skill in the art.

Example 1

$LiPF_6$ was added to a solution in which 230 parts by weight of an ethyl propionate (EP) was mixed with 100 parts by weight of an ethyl carbonate (EC) to give a 1M $LiPF_6$ solution, and then 3.3 parts by weight of biphenyl (BP) was added thereto to prepare a non-aqueous electrolyte solution.

Examples 2 to 7

Non-aqueous electrolyte solutions were prepared in the same way as in the Example 1, except that amount of the carbonate compound and linear ester compound was changed as seen in the following Table 1.

Comparative Example 1

$LiPF_6$ was added to a solution in which 230 parts by weight of an ethyl propionate (EP) was mixed with 100 parts by weight of an ethyl carbonate (EC) to prepare 1M $LiPF_6$ solution as a non-aqueous electrolyte solution.

Comparative Example 2

A non-aqueous electrolyte solution was prepared in the same way as in the Comparative Example 1, except that methyl propionate (MP) was used as the linear ester compound.

Comparative Example 3

A non-aqueous electrolyte solution was prepared in the same way as in the Comparative Example 1, except that diethyl carbonate (DEC) was used instead of the linear ester compound.

Comparative Example 4

A non-aqueous electrolyte solution was prepared in the same way as in the Comparative Example 1, except that an organic solvent in which about 100 parts by weight of an ethyl carbonate, 117 parts by weight of a diethyl carbonate and 117 parts by weight of an ethyl propionate were mixed.

Comparative Example 5

A non-aqueous electrolyte solution was made prepared in the same way as in the Comparative Example 1, except that an organic solvent in which 100 parts by weight of an ethyl carbonate, 230 parts by weight of a diethyl carbonate and -butylolactone are used.

Lithium ion secondary batteries of the pouch type including the non-aqueous electrolyte solution according to each of the Examples 1 to 7 and the Comparative Examples 1 to 4 were manufactured using $LiCoO_2$ as a cathode and artificial graphite as an anode. For the manufactured battery, low temperature discharging capacity and swelling at high temperatures were measured in the following manner.

Measurement of Low Temperature Discharge Capacity

The manufactured battery was initially charged/discharged at room temperature and then charged/discharged three times at a 0.2 C current rate. A discharge capacity at the fifth time is shown in Table 1. Subsequently, the battery was charged at room temperature at a 0.2 C current rate. A ratio of the discharge capacity at a 0.2 C current rate at −20° C. relative to the discharge capacity at a 0.2 C current rate at room temperature is shown in Table 1.

Measurement of Swelling Level at High Temperature

The manufactured battery was initially charged/discharged at room temperature and then charged/discharged three times at a 0.2 C current rate, which was terminated at the final time in a charged state. The battery in a charged state is tested to measure its thickness while increasing a temperature from room temperature to 90° C. over 1 hour, keeping the temperature at 90° C. for 4 hours, and decreasing the temperature to room temperature over 1 hour. The measured results are shown in Table 1.

TABLE 1

|  | Solvent | | Decomposition inhibitor | Discharging capacity at room temperature (mAh) | Ratio of −20° C. discharging capacity relative to room temperature discharging capacity (%) | Thickness increase at high temperature (mm) |
|---|---|---|---|---|---|---|
|  | Kind | Mixing ratio | | | | |
| Example 1 | EC:EP | 100:230 | biphenyl | 910 | 80 | 0.21 |
| Example 2 | EC:EP | 100:230 | γ-butyrolactone | 900 | 81 | 0.14 |
| Example 3 | EC:EP | 100:230 | Tris(trifluoroethyl)phosphate | 905 | 80 | 0.08 |
| Example 4 | EC:EP | 100:230 | Succinonitrile | 908 | 81 | 0.11 |
| Example 5 | EC:MP | 100:230 | γ-butyrolactone | 911 | 85 | 0.35 |
| Example 6 | EC:DEC:EP | 100:117:117 | γ-butyrolactone | 909 | 72 | 0.11 |
| Example 7 | EC:EP | 100:230 | Cyclohexyl benzene | 909 | 81 | 0.19 |
| Comparative Example 1 | EC:EP | 100:230 | — | 905 | 82 | 0.84 |
| Comparative Example 2 | EC:MP | 100:230 | — | 909 | 88 | 1.55 |
| Comparative Example 3 | EC:DEC | 100:230 | — | 910 | 73 | 0.57 |
| Comparative Example 4 | EC:DEC:EP | 100:117:117 | — | 905 | 43 | 0.57 |
| Comparative Example 5 | EC:DEC | 100:230 | γ-butyrolactone | 908 | 74 | 0.55 |

As seen from the Table 1, it is apparent that the non-aqueous electrolyte solutions containing the linear ester compound, prepared according to the Examples 1 to 7 and Comparative Examples 1, 2 and 4, show excellent low temperature discharging characteristics as compared to those of the Comparative Examples 3 and 5 without any linear ester compound.

In addition, Comparative Example 5, which contains γ-butylolactone, but does not contain a linear ester compound, also shows that the inhibitor alone cannot secure excellent low temperature discharge properties and sharp decrease of swelling problem.

Further, it is evident that the non-aqueous electrolyte solutions of Examples 1-7 using the linear ester compound and the linear ester decomposition inhibitor together greatly reduce swelling phenomena at high temperatures in comparison to those of the Comparative Examples 1 to 4 without any linear ester decomposition inhibitor.

INDUSTRIAL APPLICABILITY

As explained above, the non-aqueous electrolyte solution for a lithium ion secondary battery according to the present invention restrains swelling phenomenon while improving low temperature charging/discharging characteristics of a secondary battery.

What is claimed is:

1. A non-aqueous electrolyte solution for a lithium ion secondary battery, which includes a lithium salt and an organic solvent,
   wherein the organic solvent includes 100 parts by weight of a carbonate compound, 100 to 250 parts by weight of a propionate-based ester compound and 0.1 to 20 parts by weight of an inhibitor to inhibit decomposition of the propionate-based ester compound,
   wherein the propionate-based ester compound is expressed by the following Chemical Formula 1

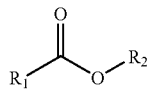

Chemical Formula 1 in which $R_1$ is a $CH_3CH_2$ group, and $R_2$ is a linear or branched C1-5 alkyl group, and $R_1$ and/or $R_2$ may be unsubstituted or substituted with at least one halogen, and
   wherein the inhibitor is any one material or a mixture of at least two materials selected from the group consisting of pyrrole, thiophene, aniline, biphenyl, cyclohexyl benzene, fluoro-toluene, tris(trifluoroethyl)phosphate, γ-butyrolactone, γ-valerolactone, butyronitrile, hexanenitrile, succinonitrile, adiponitrile, valeronitrile, siloxane, silane and halogenated compounds thereof, and
   wherein the carbonate compound is any one material or a mixture of at least two materials selected from the group consisting of ethylene carbonate, 3-fluoroethylene carbonate, propylene carbonate, dimethyl carbonate, diethyl carbonate, methylpropyl carbonate, ethylpropyl carbonate, methylethyl carbonate and butylene carbonate.

2. The non-aqueous electrolyte solution for a lithium ion secondary battery according to claim 1,
   wherein the propionate-based ester compound is selected from the group consisting of methyl propionate, ethyl propionate, propyl propionate, and butyl propionate.

3. The non-aqueous electrolyte solution for a lithium ion secondary battery according to claim 1,
   wherein the lithium salt is any one material or a mixture of at least two materials selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$ and $LiC(CF_3SO_2)_3$.

4. A lithium ion secondary battery, which includes an electrode structure having a cathode, an anode and a separator interposed between the cathode and the anode, and a non-aqueous electrolyte solution injected into the electrode structure, wherein the non-aqueous electrolyte solution is a non-aqueous electrolyte solution for a lithium ion secondary battery defined in claim 1.

5. A non-aqueous electrolyte solution for a lithium ion secondary battery, which includes a lithium salt and an organic solvent, wherein the organic solvent includes 100 parts by weight of a carbonate compound, 100 to 250 parts by weight of a propionate ester compound and 0.1 to 20 parts by weight of an inhibitor to inhibit decomposition of the propionate ester compound, wherein the propionate ester compound is ethyl propionate or methyl propionate, and wherein the inhibitor is any one material or a mixture of at least two materials selected from biphenyl, cyclohexyl benzene, tris(trifluoroethyl)phosphate, γ-butyrolactone, succinonitrile, valeronitrile, siloxane, and silane, and wherein the carbonate compound is any one material or a mixture of at least two materials selected from the group consisting of ethylene carbonate, 3-fluoroethylene carbonate, propylene carbonate, dimethyl carbonate, diethyl carbonate, methylpropyl carbonate, ethylpropyl carbonate, methylethyl carbonate and butylene carbonate.

6. A non-aqueous electrolyte solution for a lithium ion secondary battery, which includes a lithium salt and an organic solvent, wherein the organic solvent includes 100 parts by weight of a carbonate compound, 100 to 250 parts by weight of a propionate ester compound and 0.1 to 20 parts by weight of an inhibitor to inhibit decomposition of the propionate ester compound, wherein the propionate ester compound is ethyl propionate, and wherein the inhibitor is any one material or a mixture of at least two materials selected from biphenyl, cyclohexyl benzene, tris(trifluoroethyl)phosphate, γ-butyrolactone, succinonitrile, valeronitrile, siloxane, and silane, and wherein the carbonate compound is any one material or a mixture of at least two materials selected from the group consisting of ethylene carbonate, 3-fluoroethylene carbonate, propylene carbonate, dimethyl carbonate, diethyl carbonate, methylpropyl carbonate, ethylpropyl carbonate, methylethyl carbonate and butylene carbonate.

* * * * *